(12) United States Patent
Zeltser et al.

(10) Patent No.: US 9,215,517 B2
(45) Date of Patent: Dec. 15, 2015

(54) SWITCHING CLOS NETWORK UNIVERSAL ELEMENT

(71) Applicant: Compass Electro Optical Systems Ltd., Netanya (IL)

(72) Inventors: Alexander Zeltser, Netanya (IL); Vladimir Miliavsky, Petah Tikva (IL); Niv Margalit, Ramat Hasharon (IL); Iftah Meyron, Kiryat Ono (IL); David Zelig, Zichron Yaakov (IL); David Chairman, Zoran (IL); Michael Mesh, Kfar Saba (IL)

(73) Assignee: Compass Electro Optical Systems Ltd., Netanya (IL)

( * ) Notice: Subject to any disclaimer, the term of this patent is extended or adjusted under 35 U.S.C. 154(b) by 377 days.

(21) Appl. No.: 13/678,386

(22) Filed: Nov. 15, 2012

(65) Prior Publication Data
US 2014/0133851 A1    May 15, 2014

(51) Int. Cl.
*H04J 14/00* (2006.01)
*H04Q 11/00* (2006.01)

(52) U.S. Cl.
CPC ... *H04Q 11/0005* (2013.01); *H04Q 2011/0056* (2013.01)

(58) Field of Classification Search
CPC ...... H04B 10/40; H04B 10/43; H04B 10/275; H04B 10/278; H04J 14/0267; H04J 14/0269; H04Q 11/0005; H04L 49/15; H04L 49/1515
USPC ........ 398/45, 46, 47, 48, 49, 501, 53, 54, 58, 398/59, 79, 135, 138, 139, 136, 137; 385/24, 16, 17, 18, 89, 92, 93, 90, 88
See application file for complete search history.

(56) References Cited

U.S. PATENT DOCUMENTS

| | | | |
|---|---|---|---|
| 4,850,044 A | | 7/1989 | Block et al. |
| 5,798,580 A | * | 8/1998 | Morozov et al. ............... 307/112 |
| 6,527,456 B1 | * | 3/2003 | Trezza ............................ 385/89 |
| 7,840,136 B1 | | 11/2010 | Cunningham et al. |

(Continued)

OTHER PUBLICATIONS

Esener, Sadik E., "Implementation and Prospects for chip-to-chip free-space optical interconnects," IEEE, Electron Devices Meeting, IEDM'01, Technical Digest, 4 pages (No month listed 2001).

(Continued)

*Primary Examiner* — Hanh Phan
(74) *Attorney, Agent, or Firm* — Wilmer Cutler Pickering Hale and Dorr LLP

(57) ABSTRACT

A switching Clos network universal element that can dynamically change its role is disclosed. The universal element contains a matrix of VCSELs and a matrix of photodiodes on top of an electro-optical chip. The matrix of VCSELs sends data via a first set of optical links, and the matrix of photodiodes receives data a second set of optical links. The universal element also receives and sends data through electronic links. The universal element can function as an expander, aggregator or transitive switch in a folded Clos network. As an expander or an aggregator, the universal element uses its optical links as ingress links and its electronic links as egress links. Using this universal element, a network can be constructed without separate switching elements. Multiple universal elements can be positioned on a PCB, and the multiple universal elements can function as one switch.

11 Claims, 5 Drawing Sheets

(56) References Cited

U.S. PATENT DOCUMENTS

2002/0149825 A1 10/2002 Levy et al.
2005/0129348 A1 6/2005 Iwasaki
2006/0165070 A1 7/2006 Hall et al.

OTHER PUBLICATIONS

International Search Report and Written Opinion Issued by the U.S. Patent and Trademark Office as International Searching Authority for International Application No. PCT/IB13/03049 mailed Jul. 11, 2014 (9 pgs.).

Plant, D.V. et al., "256-Channel Bidirectional Optical Interconnect Using VCSELs and Photodiodes on CMOS," Journal of Lightwave Technology, vol. 19, No. 8, 11 pages (Aug. 2001).

* cited by examiner

SWITCHING CLOS NETWORK UNIVERSAL ELEMENT

BACKGROUND OF THE INVENTION

1. Field of the Invention

The present disclosure relates to the field of switching in a Clos network. Specifically, the present disclosure relates to a universal element that can dynamically change its role for various stages.

2. Description of Related Art

Clos and folded Clos packet switching network architectures are widely used in high performance computing clusters and big scalable routers. The simplest full Clos architecture requires 3-stage switching and 3 types of switching fabrics. For the folded Clos, the simplest form uses 3 stages and 2 types of fabrics.

Usually, a 3-stage Clos network is described with 3 distinct parameters: n, k, and m, where n is the number of egress links per each of the stage 1 and stage 3 nodes, k is the number of stage 2 nodes, and m is the number of stage 1 or stage 3 nodes. A first set of ingress links connect each stage 1 node to each stage 2 node, and a second set of ingress links connects each stage 2 node to each stage 3 node. Because of the connectivity, the number of stage 2 nodes, k, is equal to the number of ingress links, and the number of stage 1 or stage 3 nodes is equal to the number of ingress links per each stage 2 node. The size of a network, or the total number of egress links, is $N=n \times m$.

A Clos network has an expansion factor of $E=k/n$. The expansion factor is a measure of data flow in a network. Typically, a Clos network can be non-blocking when $m \geq 2n-1$. This non-blocking characteristic may be crucial for networks with burst traffic and traffic composed of fractions of multicast packets.

Developing an "on the chip" solution, or having all components on one chip, for high performance switching elements suffers from a number of physical limitations. The limitations include essential power dissipation, form-factor limitations for high bitrate electronic Serializers/Deserializers (SerDes'es) as the number of elements increases, distances between the elements, and interconnection complexity when using switching fabrics with a low capacity. A Clos network with low capacity switches requires more stages and thus more switching elements and physical connectors to be placed on a chip.

SUMMARY

A switching Clos network universal element that can dynamically change is provided. The universal element includes a matrix of VCSELs and a matrix of photodiodes on top of an electro-optical chip. The matrix of VCSELs sends data via a first set of optical links, and the matrix of photodiodes receives data via a second set of optical links. The universal element also receives and sends data through electric links. The universal element can function as an expander, aggregator or transitive switch in a folded Clos network. As an expander or an aggregator, the universal element may use its optical links as ingress links and its electronic links as egress links. Using this universal element, a network can be constructed without separate switching elements.

In an aspect of the present disclosure, a system for providing switching between network elements includes a printed circuit board (PCB) and a first electro-optical chip and a second electro-optical chip positioned on the PCB. The system also includes a first matrix of photodiodes and a first matrix of VCSELs on the first electro-optical chip. The system further includes a second matrix of photodiodes and a second matrix of VCSELs on the second electro-optical chip. In addition, the system includes a first plurality of optical links coupling the first matrix of photodiodes with the second matrix of VCSELs and a second plurality of optical links coupling the second matrix of photodiodes with the first matrix of VCSELs. The first matrix of photodiodes is configured also to receive optical data via a third plurality of optical links, and the second matrix of photodiodes is configured also to receive optical data via a fourth plurality of optical links. Furthermore, the first matrix of VCSELs is configured also to transmit optical data via a fifth plurality of optical links, and the second matrix of VCSELs is configured also to transmit optical data via a sixth plurality of optical links.

Additional features may appear in aspects of the present disclosure. For example, the system may include a plurality of electronic links coupling the first electro-optical chip with the second electro-optical chip. The electronic links may be bidirectional or unidirectional. The electronic links may be electronic SerDes'es. The number of optical links in the first plurality of optical links plus the number of electronic links may be equal to the number of optical links in the third plurality of optical links. The number of optical links in the second plurality of optical links plus the number of electronic links may be equal to the number of optical links in the fourth plurality of optical links.

In another aspect of the present disclosure, a method of producing an electro-optical switch includes providing a first electro-optical chip and a second electro-optical chip on a printed circuit board (PCB), each electro-optical chip comprising a matrix of photodiodes and a matrix of VCSELs. The method also includes coupling the matrix of photodiodes of the first electro-optical chip with the matrix of VCSELs of the second electro-optical chip via a first plurality of optical links and coupling the matrix of photodiodes of the second electro-optical chip with the matrix of VCSELs of the first electro-optical chip via a second plurality of optical links. The first matrix of photodiodes is configured also to receive optical data via a third plurality of optical links, and the second matrix of photodiodes is configured also to receive optical data via a fourth plurality of optical links. Furthermore, the first matrix of VCSELs is configured also to transmit optical data via a fifth plurality of optical links, and the second matrix of VCSELs is configured also to transmit optical data via a sixth plurality of optical links.

DETAILED DESCRIPTION

According to aspects of the present disclosure, a switching Clos network universal element is disclosed. The universal element can dynamically change to an expander, a transitive switch, and an aggregator. Because this element can play all three roles, a Clos network can be built without separate switching elements for the three separate roles.

Clos Network and Folded Clos Network

Figure 1A:
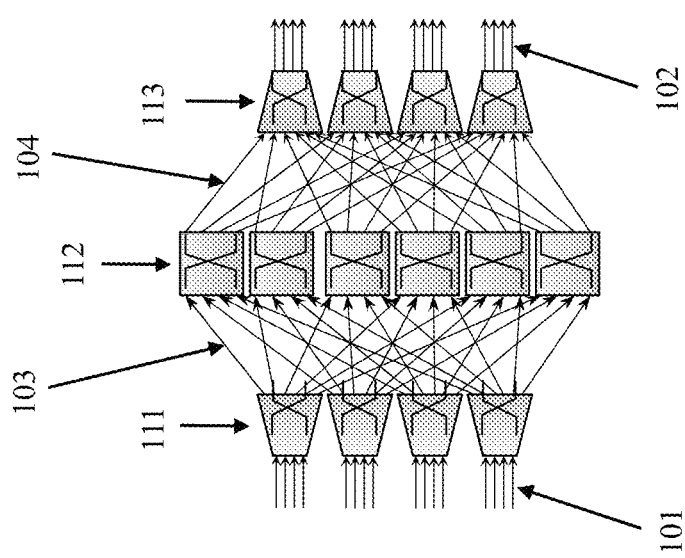
FIG. 1A shows a Clos network.

FIG. 1A shows a standard full Clos network. In FIG. 1A, Clos network 101 is a simple three stage 16×16 Clos switching network. Clos network 101 contains switching elements 111, 112 and 113. Switching elements 111 are stage 1 elements, or expanders, that spread traffic from 4 lines of input to 6 lines of output. The 4 lines of input enter switching elements 111 through egress links 101. Ingress links 103 transfer the output packets of switching elements 111 to each of switching elements 112. Switching elements 112 are 4×4 transitive switches, or stage 2 switches. Ingress links 104 carry the output of switching elements 112 to each of switching elements 113. Switching elements 113 are the stage 3 elements, or aggregators. Switching elements 113 aggregate the data from the 6 stage 2 switches to 4 lines of output. The 4 lines of output exit switching elements 113 through egress links 102.

Figure 1B:
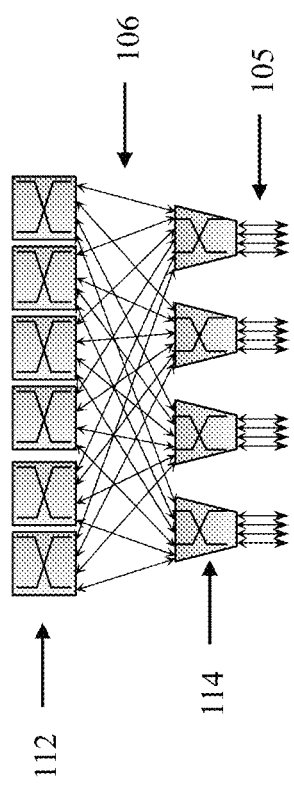
FIG. 1B shows a folded Clos network.

FIG. 1B presents a folded Clos network that has the same setup as the standard Clos network shown in FIG. 1A. In folded Clos network 102, stage 1 and 3 elements are assembled into stage 1+3 switches, as illustrated by switching elements 114. Through egress links 105, packets of data enter elements 114, where the packets are expanded. Ingress links 106 carries the packets to elements 112 and back to elements 114 for aggregation. The output packets exit switching unit 114 though egress links 105. The size of a Clos network is determined by the total number of terminal nodes, which is equal to the number of egress links for all stage 1+3 switches (N=n×m).

Switching Clos Network Universal Element

Figure 2:
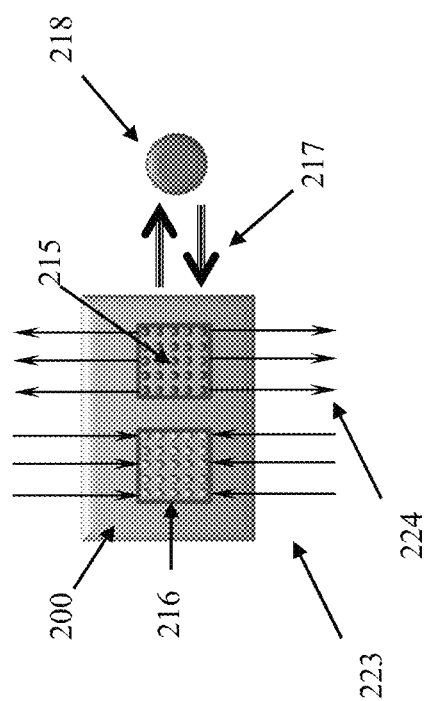
FIG. 2 shows a universal switching element used in stage 1+3 of a Clos network or a folded Clos network according to aspects of the present disclosure.

According to an embodiment of the present disclosure, a universal element contains an electro-optical chip and 2D matrices of vertical-cavity surface-emitting lasers ("VCSELs") and photodiodes on top of the electro-optical chip. FIG. 2 shows universal element 200 containing a matrix of VCSELs 215 and a matrix of photodiodes 216. Universal element 200 contains $L_e$ electronic links 217 and $L_o$ optical links 223 and 224. Photodiodes 216 receive data via optical links 223 and VCSELs 215 send data via optical links 224.

Switching Clos Network Universal Element: Stage 1+3 Switch

When universal element 200 is used as a stage 1+3 switch, electronic links 217 connect universal element 200 to external node 218. Thus, electronic links 217 function as egress links Optical links 223 and 224 connect universal element 200 with other universal elements, thus functioning as ingress links. Links 217 can be electronic Serializers/Deserializers ("SerDes'es"). Node 218 may be, for example, a terminal node, a network processor, a line card peripheral interface, or another element disposed on a line card.

In some embodiments, electronic links 217 are used between universal element 200 and terminal node 218, because electronic links are effective for a distance less than 10 cm. In such a distance electronic SerDes'es can serve the traffic with a bitrate of ~5-30 Gb/s without signal regeneration. The number of electronic links is mainly limited by a form factor of the switching element. The aggregated bandwidth of electronic SerDes'es on a universal element may be around ~0.1-1 Tb/s.

In contrast, in some embodiments an optical link can operate at a bitrate of ~10-30 Gb/s. An optical link has a low bit error rate (BER) for a distance between 100-200 m. Because of the low BER, an optical link does not require signal regeneration for a long distance. Consequently, efficient long distance connection can be made with optical links. For instance, optical links can provide connectivity in big data centers and scalable core routers or connectivity between individual blocks in a building. Individual blocks, for example, can be individual servers and LAN gateways of local subnetworks within the 100-200 m distance. In some embodiments, about 100-1000 optical links can provide connectivity to a single universal element, because the VCSEL and photodiode pitches are upper limited by approximately 100-250 um. As a result, an aggregated bitrate of optical links may be about 1-10 Tb/s.

In some embodiments the bandwidth of the optical ingress links is about ten times the bandwidth of the electronic egress links. Thus, an expansion factor may be about 10 if all electronic links and optical links are used.

In some embodiments, each input and output connection in universal element 200 is made via $L_o$ optical links and $L_e$ electronic links of the same capacity f Gb/s. $L_e$ electronic links are used as n egress links and $L_o$ optical links are used as k ingress links for each input and output connection. For non-blocking, the network is made such that k>2n. Consequently, a line card with integrated universal element 200 corresponds to the stage 1+3 switches with n×k switching capabilities.

Switching Clos Network Universal Element: Stage 2 Switch

Universal element 200 can also be used as a stage 2 switch. In one embodiment, $L_o$ optical links 218 are used to connect universal element 200 to other universal elements that function as stage 1+3 switches. Stage 1+3 switches use optical links 218 to connect with stage 2 switches because of the inefficiency in long distance connection. Thus, stage 2 switches may not use electronic links 217 as ingress links. However, $L_e$ electronic links can be used if opto-electronic and electro-optical transducers are used. The transducers transform electronic data to optical data or optical data to electronic data, thereby enabling connection between optical links of a stage 1+3 switch and electronic links of a stage 2 switch.

Switching Clos Network Universal Element: Composite Block

Figure 3:
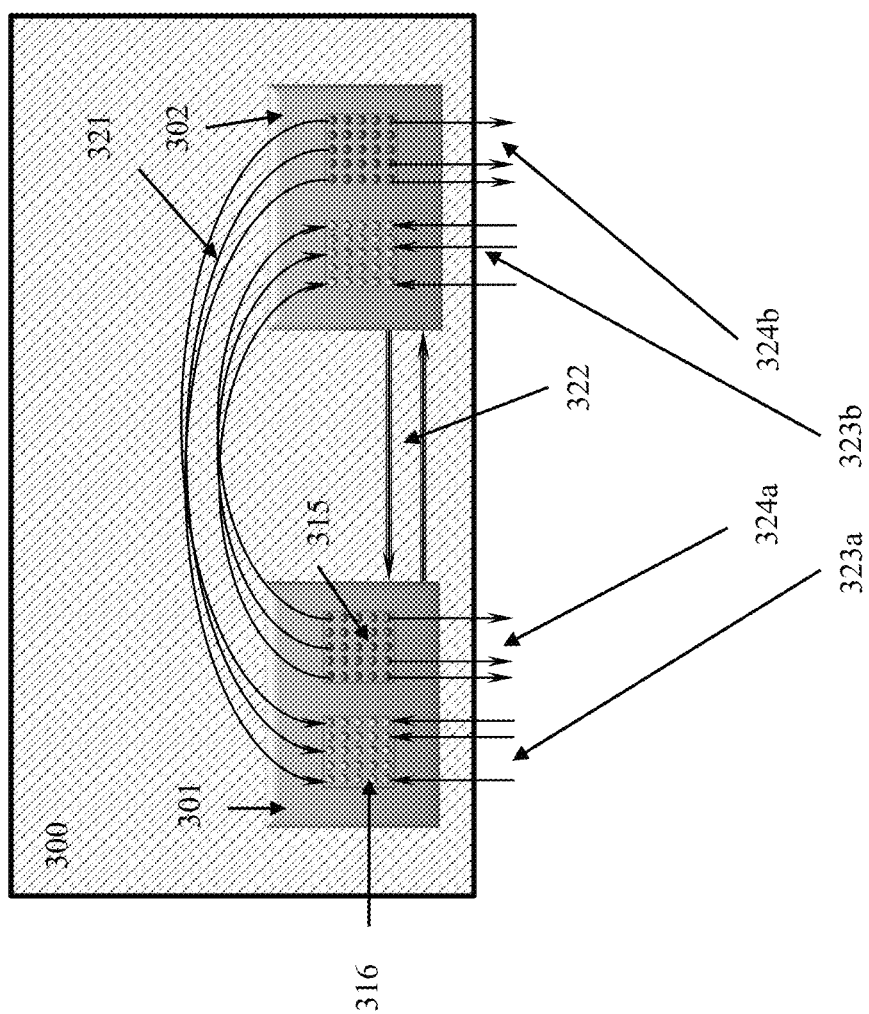
FIG. 3 shows a universal switching element used in stage 2 of a Clos network or a folded Clos network according to aspects of the present disclosure.

In some embodiments, two universal elements are used as one switch, and both the optical and electronic links of the two universal elements are fully utilized. FIG. 3 shows two universal elements 301 and 302 disposed on one printed circuit board 300. The total number of available links for each input and output are $2L_e+2L_o$ because there are two universal elements. To provide an equal number of connections internally and externally, $L_e+L_o$ number of links are reserved for connection within the PCB, and the other $L_e+L_o$ number of links are reserved for external connection.

In FIG. 3, electronic links 322 provide internal connection (that is, connection between universal elements 301 and 302), because the universal elements are disposed on the same printed circuit board 300 and the distance between the universal elements are small. Then, the external connection for each input and output are made through $L_o+L_e$ number of optical links. Half of the external connection is made using universal element 301, and the other half using universal element 302. Therefore, each universal element has about $(L_o+L_e)/2$ input optical links 323 and the same number of output optical links 324.

Now $2\times L_e$ number of electronic links 322 and $L_o-L_e$ number of optical links 321 are used internally. Because an input link to universal element 301 is an output link to universal link 302 and vice versa, $L_e$ electronic links 322 and $(L_o-L_e)/2$ optical links 321 provide internal connection between universal element 301 and 302 for each direction.

There are $L_e+L_o$ external connections, so printed circuit board 300 with two universal elements 301 and 302 functions as one transitive switch of m×m, where $m=L_e+L_o$.

To use the composite block of two universal elements, all available stage 1+3 switches are divided into two groups. Data from the first group of stage 1+3 switches enters the photodiodes of universal element 301 via links 323a, and data from the second group enters the photodiodes of universal element 302 via 323b. Data exiting via links 324b and 324a enters the first group of stage 1+3 switches and the second group of stage 1+3 switches, respectively. The composite block provides switching capacity of $(L_e+L_o)\times(L_e+L_o)$.

In some embodiments, the routing for the composite switch is provided by the following method. Data from the first group of stage 1+3 switches is transmitted to the second group using links 323a, the electro-optical chip of universal element 301, and links 324a. Photodiodes 316 receives the data from links 323a, electro-optical chip 301 transmits the data to VCSELs 315, VCSELs 315 transmits the data to the second group of stage 1+3 switches via links 324a. Likewise, traffic from the second group to the first group only uses links 323b and 324b and the electro-optical chip of universal element 302.

When traffic flows from a switch in the first group of stage 1+3 switches to another switch in the first group, the traffic flows through links 323a, universal element 301, internal links 321 and 322, universal element 302 and links 324b. Traffic from a switch in the second group of stage 1+3 switches to another switch in the second group can be routed similarly, but in an opposite direction.

The composite block was described using two universal elements. But different forms of the composite block using a different number of universal elements are possible.

Switching Clos Network Universal Element in a Full Mesh Network

The proposed universal element can connect nodes in a full mesh network of l nodes. The number of ingress links is one less than the number of nodes, k=l−1, because each node connects to l−1 other nodes using l−1 ingress links. n egress links connect each node to n corresponding terminal nodes. For a full mesh network with n egress links and k ingress links, the size of the network is $N=n\times l=n\times(k+1)$. In addition, in a full mesh network, the number of stage 1+3 switches are equal to the number of stage 2 switches, or m=k, because every node contains one stage 1+3 switch and one stage 2 switch.

Internal network routing protocol may allow a packet to reach its destination with two or more hops. In a multi-hop transfer mechanism, every node needs to determine the destination of incoming traffic. If the destination of the packet is the receiving node, the receiving node acts as a stage 3 switch, or an aggregator. If the destination is another node, the receiving node sends the packet to its destination node, acting as a stage 2 switch. Internal network routing protocol may also provide uniform distribution of traffic through electronic interfaces between output optical links.

Figure 4:
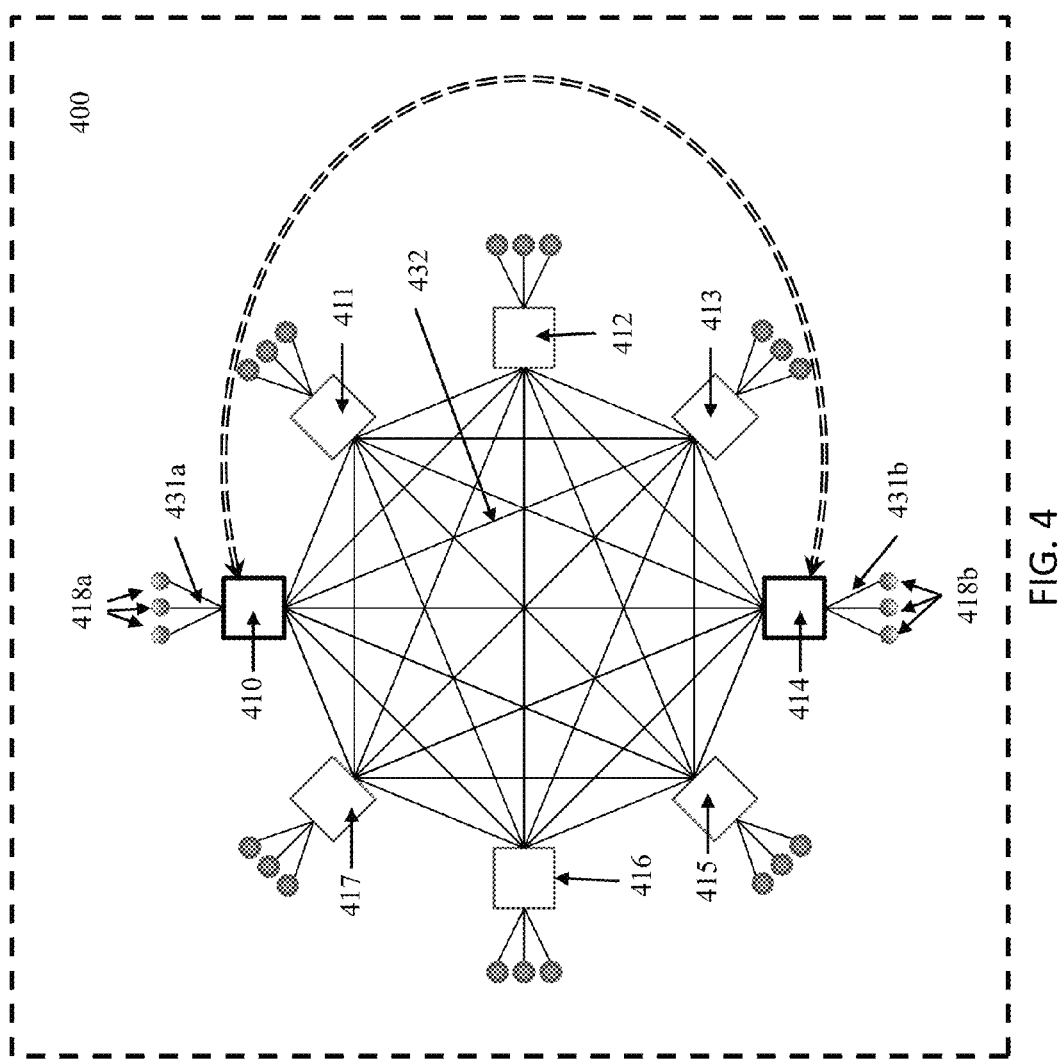
FIG. 4 shows a load balancing network using universal switching elements in the stages of a Clos network according to aspects of the present disclosure.

FIG. 4 presents a sample embodiment of a full mesh network with n=3 and k=7. There are three egress links, one from each of three terminal nodes 418 to nodes 410-417, so n=3. There are total of 8 nodes in the network, so the number of ingress links is 7. Each of nodes 410-417 uses the universal element as its switch. Electronic links connect the universal element to the terminal nodes, and optical links connect the universal elements of multiple nodes.

This sample embodiment is not a Clos network in a strict sense. In an ordinary Clos network, stage 1+3 switches have no connection to each other, and stage 2 switches have no connection to terminal nodes. In this network, a stage 1+3 switch and a stage 2 switch are merged into one universal element. In other words, unlike a standard 3-stage Clos network, Clos network 400 utilizes links that connect expanders and aggregators without first connecting transitive switches. Therefore, a switch that connects to a set of terminal nodes can be directly connected to another switch that connects to another set of terminal nodes. Because a switch can be connected to k other switches, the size of this network is $N_{Mesh}=n\times l=n\times(k+1)$. In a typical Clos network without the direct connection between two stage 1+3 switches, there are k−1 connections between any two switches. Thus, the size of the Clos network is $N_{Clos}=n\times k$.

The universal element of the present disclosure can operate as a stage 1, 2, or 3 switch. As a stage 1 or 3 switch, a universal element provides n×k switching capability. As a stage 2 switch, a universal element provides k×k switching capability.

All links, including ingress links 432 and egress links 431, may have the same bandwidth. In this case, there are 3 egress links and 1 direct ingress link between any pair of universal elements. Thus, the combined bandwidth for egress links 431 is 3 times larger than the bandwidth of an ingress link 432. To provide enough bandwidth for maximum traffic, the system may split data from terminal nodes 418 and transmit the data using multiple ingress links 432. One efficient way of using multiple links can be achieved by using intermediate nodes and allowing at least 2 hops transfer.

Traffic between node 410 and node 414 can flow through the direct links or nodes 411-413 and 415-417 as stage 2 Clos switches. As an expander with an expansion factor k/n, node 410 evenly distributes packets among its ingress links. Then nodes 411-413 and 415-417 function as transitive switches, redirecting the packets to node 414. If ingress links have a bandwidth of f Gb/s, node 414 can use k ingress links to receive the packets at the maximum combined bandwidth of k×f Gb/s. As an aggregator, node 414 aggregates the traffic from its ingress links and sends it to its three terminal nodes 418b.

As will be apparent to one of ordinary skill in the art from a reading of this disclosure, the present disclosure can be embodied in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein. The scope of the invention is as set forth in the appended claims and equivalents thereof, rather than being limited to the examples contained in the foregoing description.

What is claimed is:

1. A system for providing switching between network elements comprising:
   a printed circuit board (PCB);
   a first electro-optical chip and a second electro-optical chip positioned on the PCB;

a first matrix of photodiodes and a first matrix of VCSELs on the first electro-optical chip;

a second matrix of photodiodes and a second matrix of VCSELs on the second electro-optical chip;

a plurality of electronic links coupling the first electro-optical chip with the second electro-optical chip;

a first plurality of optical links coupling the first matrix of photodiodes with the second matrix of VCSELs; and a second plurality of optical links coupling the second matrix of photodiodes with the first matrix of VCSELs;

wherein the first matrix of photodiodes is configured also to receive optical data via a third plurality of optical links;

wherein the second matrix of photodiodes is configured also to receive optical data via a fourth plurality of optical links;

wherein the first matrix of VCSELs is configured also to transmit optical data via a fifth plurality of optical links;

wherein the second matrix of VCSELs is configured also to transmit optical data via a sixth plurality of optical links; and wherein the number of optical links in the first plurality of optical links plus the number of electronic links is equal to the number of optical links in the third plurality of optical links.

2. The system of claim 1, wherein the electronic links are bidirectional.

3. The system of claim 1, wherein the electronic links are unidirectional.

4. The system of claim 1, wherein the electronic links include electronic SerDes'es.

5. The system of claim 1, wherein the number of optical links in the second plurality of optical links plus the number of electronic links is equal to the number of optical links in the fourth plurality of optical links.

6. A method of producing an electro-optical switch comprising:

providing a first electro-optical chip and a second electro-optical chip on a printed circuit board (PCB), each electro-optical chip comprising a matrix of photodiodes and a matrix of VCSELs;

coupling the first electro-optical chip and the second electro-optical chip with a plurality of electronic links;

coupling the matrix of photodiodes of the first electro-optical chip with the matrix of VCSELs of the second electro-optical chip via a first plurality of optical links;

coupling the matrix of photodiodes of the second electro-optical chip with the matrix of VCSELs of the first electro-optical chip via a second plurality of optical links;

configuring the first matrix of photodiodes also to receive optical data via a third plurality of optical links, wherein the number of optical links in the first plurality of optical links plus the number of electronic links is equal to the number of optical links in the third plurality of optical links;

configuring the second matrix of photodiodes also to receive optical data via a fourth plurality of optical links;

configuring the first matrix of VCSELs also to transmit optical data via a fifth plurality of optical links; and configuring the second matrix of VCSELs also to transmit optical data via a sixth plurality of optical links.

7. The method of claim 6, wherein the electronic links are bidirectional.

8. The method of claim 6, wherein the electronic links are unidirectional.

9. A switching network comprising:

a plurality of universal elements, each universal element comprising:

an electro-optical chip, a matrix of photodiodes on the electro-optical chip configured to receive optical data via a first plurality of optical links and transmit data via a first plurality of electronic links, and a matrix of VCSELs on the electro-optical chip configured to transmit data via a second plurality of optical links and transmit data via a second plurality of electronic links;

a plurality of composite elements, each composite element comprising first and second universal elements positioned on a printed circuit board (PCB), in optical communication via a third plurality of optical links and a plurality of electronic links;

wherein a number of optical links configured to receive data at the first universal element from sources outside the composite element is equal to a total number of optical and electronic links configured to send data from the first universal element to the second universal element; and wherein a number of optical links configured to receive data at the second universal element from sources outside the composite element is equal to a total number of optical and electronic links configured to send data from the second universal element to the first universal element.

10. The switching network of claim 9, wherein the switching network comprises a plurality of said composite elements acting as stage 1+3 folded Clos switches connected to a plurality of said universal elements acting as stage 2 folded Clos switches.

11. The switching network of claim 9, wherein the switching network comprises a plurality of composite elements in full mesh connectivity.

* * * * *